United States Patent [19]

White

[11] 4,102,260
[45] Jul. 25, 1978

[54] CANTILEVERED TYING NEEDLE CONSTRUCTION FOR CROP BALERS

[75] Inventor: Allen A. White, Peabody, Kans.

[73] Assignee: Hesston Corporation, Hesston, Kans.

[21] Appl. No.: 767,981

[22] Filed: Feb. 11, 1977

[51] Int. Cl.² ............................................. B65B 13/04
[52] U.S. Cl. ...................................................... 100/24
[58] Field of Search .................... 100/17, 18, 19 R, 20, 100/21, 22, 23, 24, 19 A

[56] References Cited

U.S. PATENT DOCUMENTS 3,576,160  4/1971  Myer ...................................... 100/21

Primary Examiner—Billy J. Wilhite
Attorney, Agent, or Firm—Schmidt, Johnson, Hovey & Williams

[57] ABSTRACT

The needle is of tubular frame construction, having a generally overall triangular configuration by virtue of two longitudinally extending, eccentrically arcuate structural members that converge to a point of intersection as the tip of the needle is approached. Gussets between the two members brace the same against deflection toward and away from one another, and one of the members extends outwardly beyond the point of intersection to terminate as the tip of the needle. Such longer member has a transversely inverted U-shaped configuration rather than being completely tubular so as to define a receiving channel for a strand of tying material that is retained by the tip of the needle as the latter swings into operation.

9 Claims, 7 Drawing Figures

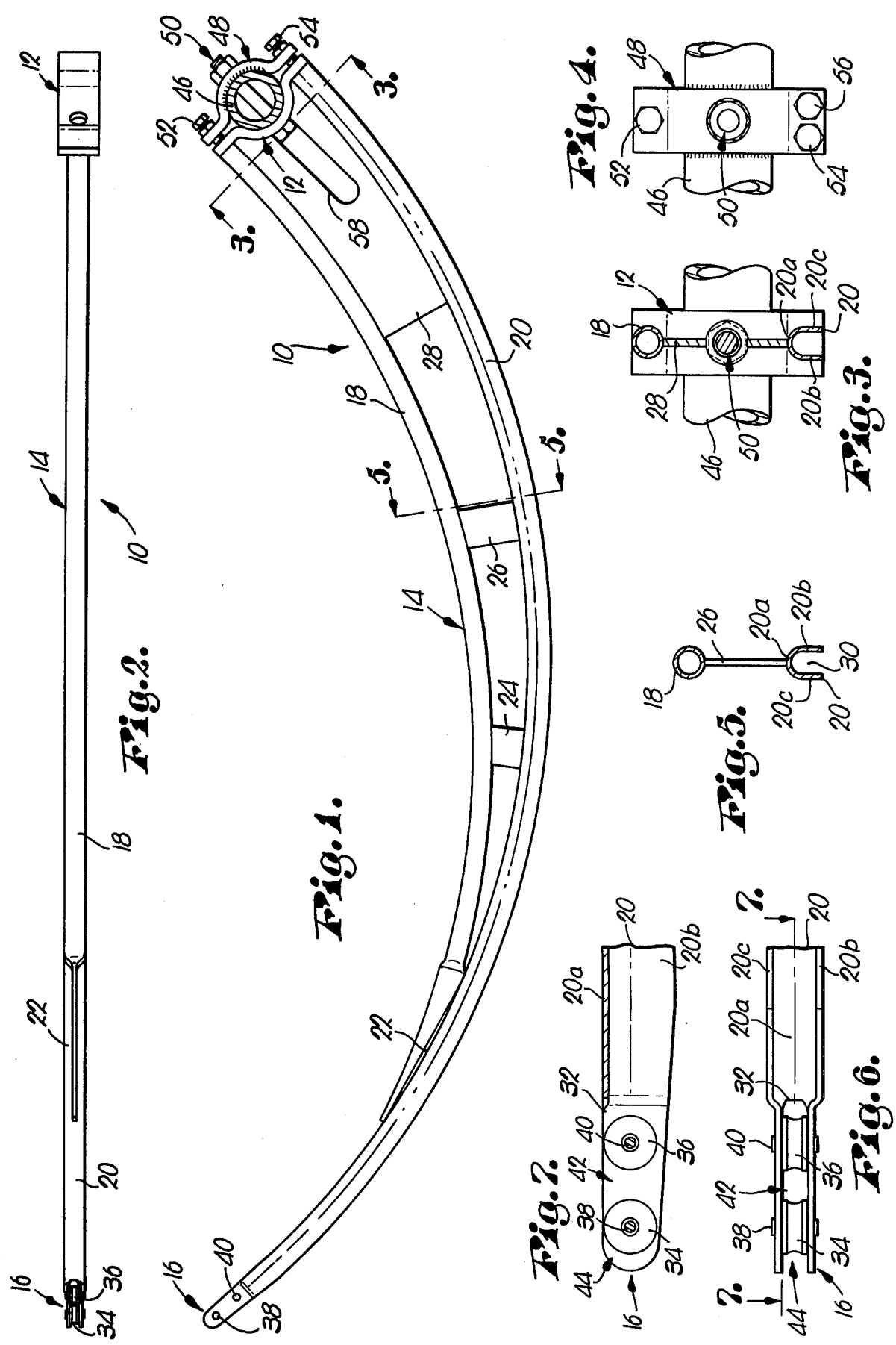

CANTILEVERED TYING NEEDLE CONSTRUCTION FOR CROP BALERS

This invention relates to tying needles used in presenting twine or other binding material to knotter mechanism associated with a crop baler in order to bind a bale formed within such baler. More particularly, it pertains to the structural characteristics of such a needle that permit it to be relatively lightweight but quite rigid and capable of bearing substantial loading, notwithstanding the cantilevered manner in which the needle may be mounted. Obtaining such qualities in a tying needle without sacrificing cost and fabrication ease represents a primary objective of the present invention.

Pursuant to the above, an important object of this invention is to provide a needle of frame construction with structural members that are arranged to yield an overall, approximately triangular configuration of the needle, the apex being adjacent the tip of the needle and the base being adjacent the cantilevered end of the needle.

A further important object of the invention is to utilize structural members that are at least essentially tubular so as to reduce weight without sacrificing strength and rigidity.

Another overall objective of the present invention is to provide a design having such excellent properties of light weight and high strength that the design may be embodied in a needle substantially larger than those in current use for operation in machines designed to produce large crop bales on the order of one ton or more, the increased dimensions of such bales necessitating the additional length on the part of the tying needles and thereby magnifying the force loadings experienced by the needles.

In the drawing:

FIG. 1 is a side elevational view of a needle constructed in accordance with the principles of the present invention;

FIG. 2 is a top plan view thereof;

FIG. 3 is an enlarged, fragmentary cross-sectional view of the mounted end of the needle taken along line 3—3 of FIG. 1;

FIG. 4 is an enlarged, fragmentary end view of the needle in the opposite direction from FIG. 3;

FIG. 5 is an enlarged cross-sectional view through the needle taken along line 5—5 of FIG. 1;

FIG. 6 is an enlarged, fragmentary bottom view of the tip of the needle; and

FIG. 7 is a fragmentary cross-sectional view of the tip taken along line 7—7 of FIG. 6.

The needle 10 exhibits an overall generally triangular configuration, having a transverse mounting plate 12 at one end thereof and an outwardly extending frame 14 that tapers toward a remote tip 16. The frame 14 is substantially planar as illustrated in FIG. 2, and is comprised primarily of a pair of structural members 18 and 20 that converge as the tip 16 is approached so as to produce the tapered or triangular effect. The member 18 is shorter than the member 20 and intersects the latter short of the tip 16 at a point designated by the numeral 22, the member 20 continuing on beyond the point 22 and terminating at its outermost end as the tip 16. At point 22 the member 18 is flattened and rigidly affixed to the member 20 such as by welding.

The space between the converging members 18 and 20 is bridged periodically by gussets 24, 26 and 28 so as to prevent deflection of the members 18 and 20 toward and away from one another and to enhance the overall rigidity of the frame 14. Each of the members 18, 20 is formed in the nature of a true arc, and the centers of such arcs are both located on the side of the frame 14 represented by the member 18. As illustrated, the arcs traced by the members 18 and 20 are eccentrically disposed with respect to one another such as to cause their intersection at point 22.

Both of the members 18 and 20 are at least essentially tubular, the top member 18 being a true tube as illustrated in FIGS. 3 and 5, while the bottom member 20 has an inverted U-shaped cross-sectional configuration. Consequently, the member 20 defines a channel 30 all along the exposed edge of the member 20 from the plate 12 to the tip 16, and such channel 30 serves to receive a strand of twine or other binding material during operation of the needle 10.

The member 20 is laterally flattened at the tip 16 and has a longitudinally extending notch 32 in its curved bight 20a. The notch 32 extends inwardly from the outermost extremity of the tip 16 a sufficient distance to expose a pair of rollers 34 and 36 mounted on transverse pins 38 and 40, respectively, and the space between the rollers 34, 36, combined with the notch 32, forms an eyelet 42 through which the twine may be threaded. The roller 34 and the opposite legs 20b and 20c of the member 20 that project outwardly beyond the periphery of the roller 34 cooperate to define a yoke 44 that can be used to capture a second strand of binding material if the bales are to be bound using a double strand system for each binding loop around the bale. Details of such a system are not particularly germane to the present invention and will, therefore, not be further discussed. Suffice it to point out, however, that where two separate strands must be retained and controlled by the tip 16 during operation of the needle 10, the latter is exposed to significantly more loading than would be true with only a single strand involved.

The needle 10 is adapted for mounting onto a transverse support, here shown in the nature of a pipe 46. While the plate 12 is rigidly affixed to the frame 14 and is formed so as to complementally fit against one arcuate side of the pipe 46, a second plate 48 is formed to complementally fit against the opposite side of the pipe 46 and is rigidly affixed thereto. A draw bolt 50 extends through the plate 12, the pipe 46 and the plate 48 so as to clamp the pipe 46 between plates 12 and 48. Enlarged openings for bolt 50 in the plates 12, 48 and the pipe 46 permit the plate 12, and thus the needle 10, to be shifted a slight amount about the periphery of pipe 46 by appropriate actuation of set-screws 52, 54 and 56. This adjusts the position of the remote tip 16. Note that a clearance slot 58 is provided in the gusset 28 for insertion and removal of the draw bolt 50.

In operation the pipe 46 swings through an arc closely paralleling the longitudinal axis of the frame 14 so that the tip 16, with its retained strand or strands, is presented to mechanism that will take the binding material and form a knot so as to complete binding of the bale. It is during this movement that substantial loading on the needle 10 may be experienced, and such loading is particularly critical in view of the cantilevered manner in which the needle 10 is supported. As is apparent, the magnitude of the loading on the needle 10 increases as the length thereof is increased, such increased length being necessary where the needle 10 is used for the binding of bales which may be substantially larger than the 60–90 pound variety typically found today.

The frame construction of the needle 10, coupled with the triangular, truss-like arrangement of the structural members 18 and 20, provides substantial strength and rigidity while minimizing weight. Thus, breakage and deformation of the needle 10 are minimized and the power requirements for swinging the needle 10 can be held to a satisfactory low level. Moreover, by maintaining a minimum weight without sacrificing strength and rigidity, problems involving momentum of the needle 10, such as ways to control the latter during abrupt starting and stopping thereof, can be substantially avoided.

The above is augmented by virtue of the fact that the structural members 18 and 20 are of essentially hollow construction, with the member 18 being completely tubular and the member 20 being inversely U-shaped. This construction provides strength with minimum weight while also holding down the cost of materials. In sum, the construction of the needle 10 as above described provides a highly attractive way of overcoming the many problems involved in devices of this type.

Having thus described the invention, what is claimed as new and desired to be secured by Letters Patent is:

1. A tying needle for crop balers comprising:
   mounting means for attaching the needle to a movable support;
   an elongated, generally planar frame extending outwardly from said mounting means and terminating in a remote tip,
   said frame tapering within said plane as said tip is approached; and
   means at said tip for retaining a strand of tying material with the needle during movement of the same with said support,
   said frame including a pair of longitudinally extending structural members laterally spaced apart adjacent said mounting means and converging as said tip is approached.

2. A tying needle as claimed in claim 1, wherein said members are provided with gusset means bridging the space between the members.

3. A tying needle as claimed in claim 1, wherein said members are both at least essentially tubular.

4. A tying needle as claimed in claim 3, wherein one of said members is open along an exposed length thereof to define a receiving channel within which said strand may lie when retained by said retaining means during operation.

5. A tying needle as claimed in claim 1, wherein one of said members intersects the other short of said tip, said other member continuing past the point of intersection to terminate as said tip.

6. A tying needle as claimed in claim 5, wherein said members are eccentrically arched with respect to one another, both of their centers lying on the same side of the longitudinal axis of the frame.

7. A tying needle as claimed in claim 6, wherein said members are provided with gusset means bridging the space between the members.

8. A tying needle as claimed in claim 7, wherein said members are both at least essentially tubular.

9. A tying needle as claimed in claim 8, wherein said other member is open along an exposed length thereof to define a receiving channel within which said strand may lie when retained by said retaining means during operation.

* * * * *